United States Patent
Chang et al.

(10) Patent No.: US 9,354,671 B2
(45) Date of Patent: May 31, 2016

(54) TOUCH DEVICE AND MANUFACTURING METHOD THEREOF

(71) Applicant: TPK Touch Systems (Xiamen) Inc., Xiamen (CN)

(72) Inventors: Heng-Yao Chang, Taoyuan (TW); Chen-Hsin Chang, Taoyuan (TW); Mengh-Sueh Wu, Taipei (TW); Che-L Wu, Hsinchu (TW); Lixian Chen, Xiamen (CN)

(73) Assignee: TPK Touch Systems (Xiamen) Inc., Xiamen (CN)

(\*) Notice: Subject to any disclaimer, the term of this patent is extended or adjusted under 35 U.S.C. 154(b) by 290 days.

(21) Appl. No.: 14/034,572

(22) Filed: Sep. 24, 2013

(65) Prior Publication Data
US 2014/0085550 A1    Mar. 27, 2014

(30) Foreign Application Priority Data

Sep. 27, 2012 (CN) .......................... 2012 1 0388193

(51) Int. Cl.
*G06F 3/045* (2006.01)
*G06F 1/16* (2006.01)
*G06F 3/044* (2006.01)
*G06F 3/0354* (2013.01)

(52) U.S. Cl.
CPC ............ *G06F 1/169* (2013.01); *G06F 3/03547* (2013.01); *G06F 3/044* (2013.01); *Y10T 29/49105* (2015.01)

(58) Field of Classification Search
CPC ...... G06F 3/0418; G06F 3/045; G06F 3/0488
USPC .................... 345/173–179; 178/18.01–18.04; 200/600; 174/126.1–126.2
See application file for complete search history.

(56) References Cited

U.S. PATENT DOCUMENTS

| | | | | |
|---|---|---|---|---|
| 2009/0002338 A1* | 1/2009 | Kinoshita | ............... | G06F 3/045 345/174 |
| 2012/0193210 A1* | 8/2012 | Yau | .......................... | G06F 3/044 200/600 |
| 2013/0169558 A1* | 7/2013 | Min | .......................... | G06F 3/044 345/173 |
| 2015/0234503 A1* | 8/2015 | Min | .......................... | G06F 3/047 345/173 |

FOREIGN PATENT DOCUMENTS

| | | |
|---|---|---|
| CN | 101869010 A | 10/2010 |
| CN | 102063232 A | 5/2011 |

\* cited by examiner

*Primary Examiner* — Kimnhung Nguyen
(74) *Attorney, Agent, or Firm* — Gokalp Bayramoglu

(57) ABSTRACT

A manufacturing method for forming a touch device is disclosed. A substrate having a viewing region is provided. A plurality of first sensing electrodes are spaced apart from each other on the substrate corresponding to the viewing region. An insulating layer is formed on the plurality of first sensing electrodes. A plurality of second sensing electrodes are transfer-printed onto the insulating layer, wherein the plurality of second sensing electrodes are spaced apart from each other, and wherein the plurality of first sensing electrodes are in a staggered arrangement with the plurality of second sensing electrodes and insulated from the plurality of second sensing electrodes by the insulating layer. A touch device is also disclosed.

22 Claims, 8 Drawing Sheets

TOUCH DEVICE AND MANUFACTURING METHOD THEREOF

BACKGROUND OF THE DISCLOSURE

All related applications are incorporated by reference. The present application is based on, and claims priority from, China Application Serial Number No. 201210388193.3, filed on Sep. 27, 2012, the disclosure of which is hereby incorporated by reference herein in its entirety.

FIELD OF THE DISCLOSURE

The present disclosure relates to touch technology, and in particular to a touch device and manufacturing method thereof.

DESCRIPTION OF THE RELATED ART

With the developments in the field of information technology, touch devices are increasingly used to provide a convenient way to deliver information between humans and machines. A typical touch device is formed by a plurality of electrodes in the x-direction and a plurality of electrodes in the y-direction in a staggered arrangement. The plurality of electrodes in the x-direction and the plurality of electrodes in the y-direction are formed on different layers and insulated from each other by an insulating layer.

Generally, a method for manufacturing the touch device comprising multiple electrode layers, comprises sequentially forming the plurality of electrodes in the x-direction, the insulating layer which covers the plurality of electrodes in the x-direction, and the plurality of electrodes in the y-direction on a substrate by performing sputtering, exposure, and developing processes. However, in the above-mentioned method for manufacturing the touch device, a previously formed layer structure may be damaged during the formation of a subsequently formed layer structure thereon. For example, the electrodes may be cracked or delaminated from the substrate after undergoing several rounds of sputtering, exposure, and developing processes.

Accordingly, there exists a need in the art for development of methods for forming a structure of a touch device capable of mitigating or eliminating the aforementioned problems.

SUMMARY OF THE DISCLOSURE

The present disclosure provides a touch device and manufacturing method thereof, wherein at least sensing electrodes are formed by a transfer-printing process so as to reduce or eliminate damage to a previously formed layer structure during the formation of a subsequently formed layer structure thereon, and therefore improving manufacturing yields.

An exemplary embodiment of a manufacturing method of a touch device is provided in accordance with the present disclosure. The manufacturing method comprises providing a substrate having a viewing region. A plurality of first sensing electrodes are spaced apart from each other on the substrate corresponding to the viewing region. An insulating layer is formed on the plurality of first sensing electrodes. A plurality of second sensing electrodes are transfer-printed onto the insulating layer, wherein the plurality of second sensing electrodes is spaced apart from each other, and wherein the plurality of first sensing electrodes is in a staggered arrangement with the plurality of second sensing electrodes and insulated from the plurality of second sensing electrodes by the insulating layer.

Another exemplary embodiment of a manufacturing method of a touch device is provided in accordance with the present disclosure. The manufacturing method comprises providing a substrate having a viewing region. The substrate has a first surface and a second surface opposite the first surface. A plurality of first sensing electrodes are spaced apart from each other on the first surface. A plurality of second sensing electrodes are transfer-printed onto the second surface and spaced apart from each other, wherein the plurality of first sensing electrodes are in a staggered arrangement with the plurality of second sensing electrodes and insulated from the plurality of second sensing electrodes by the substrate.

An exemplary embodiment of a touch device is provided in accordance with the present disclosure. The touch device comprises a substrate having a viewing region, a plurality of first sensing electrodes, an insulating layer, and a plurality of second sensing electrodes. The plurality of first sensing electrodes are spaced apart from each other on the substrate corresponding to the viewing region. The insulating layer is disposed on the plurality of first sensing electrodes. The plurality of second sensing electrodes are spaced apart from each other on the insulating layer by a transfer-printing process, and wherein the plurality of first sensing electrodes are in a staggered arrangement with the plurality of second sensing electrodes and insulated from the plurality of second sensing electrodes by the insulating layer.

Yet another exemplary embodiment of a touch device is provided in accordance with the present disclosure. The touch device comprises a substrate having a viewing region, a plurality of first sensing electrodes and a plurality of second sensing electrodes. The substrate has a first surface and a second surface opposite the first surface. The plurality of first sensing electrodes are spaced apart from each other on the first surface of the substrate. The plurality of second sensing electrodes are spaced apart from each other on the second surface of the substrate by a transfer-printing process, and wherein the plurality of first sensing electrodes are in a staggered arrangement with the plurality of second sensing electrodes and insulated from the plurality of second sensing electrodes by the substrate.

According to the embodiments, at least the second sensing electrodes of the touch device are formed by a transfer-printing process, such that the multi-layer structure is formed in two parts. Accordingly, compared to the conventional fabrication method of the sputtering, exposure, and developing processes, damage to a previously formed layer structure during the formation of a subsequently formed layer structure thereon is reduced or eliminated and manufacturing yield may be improved. Moreover, the use of the transfer-printing process instead of the sputtering, exposure, and developing processes simplifies the manufacturing process and improves production efficiency. In addition, the use of expensive equipment (such as the equipment for the sputtering, exposure, and developing processes) is not required. As a result, price competitiveness is improved and the pollution caused by chemical solutions is also reduced.

DETAILED DESCRIPTION OF THE EMBODIMENTS

Figure 1A:
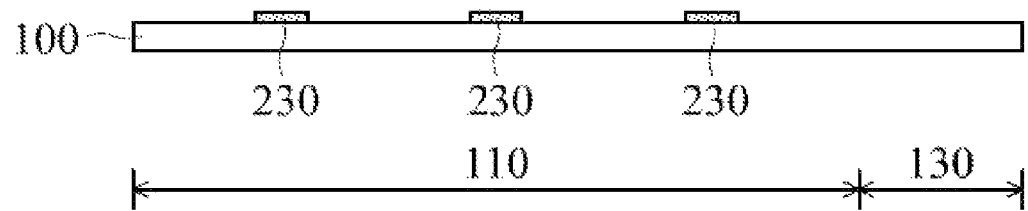
FIGS. 1A to 1E are cross-sectional views of a manufacturing method of a touch device in accordance with an embodiment of the present disclosure.

The following description is provided for the purpose of illustrating the general principles of the present disclosure and should not be taken in a limiting sense. The scope of the invention is determined by reference to the appended claims. Moreover, the same or similar elements in the drawings and the description are labeled with the same reference numbers.

Figure 1B:
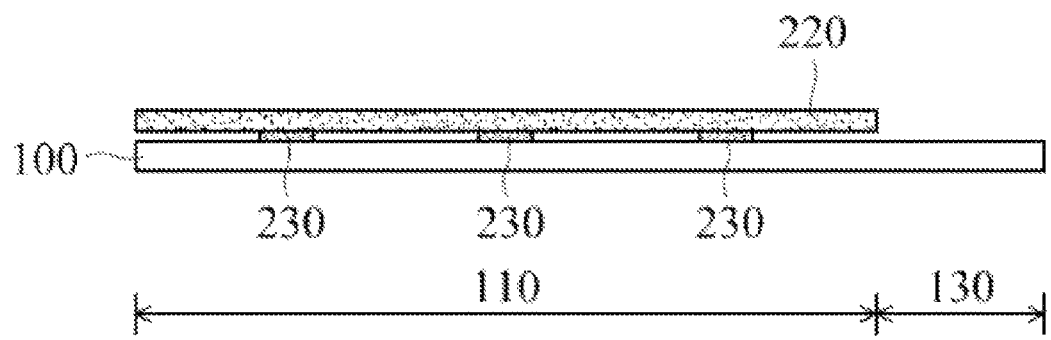
Figure 1C:
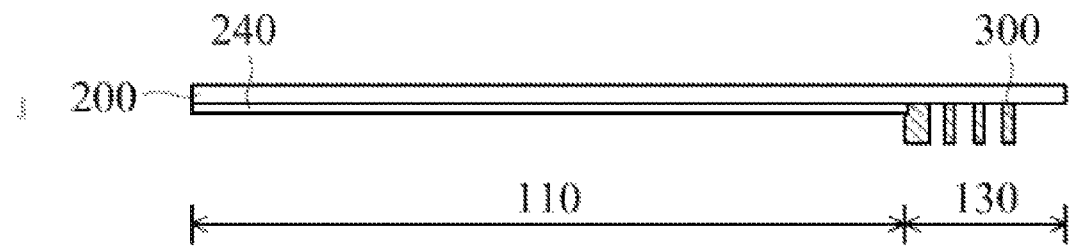
Figure 1D:
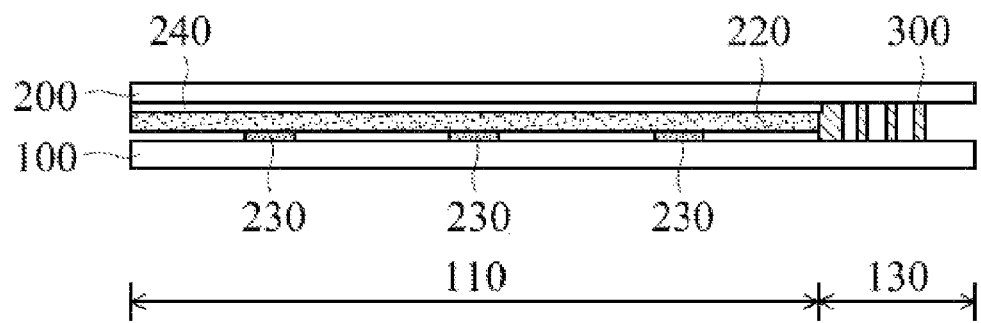
Figure 4:
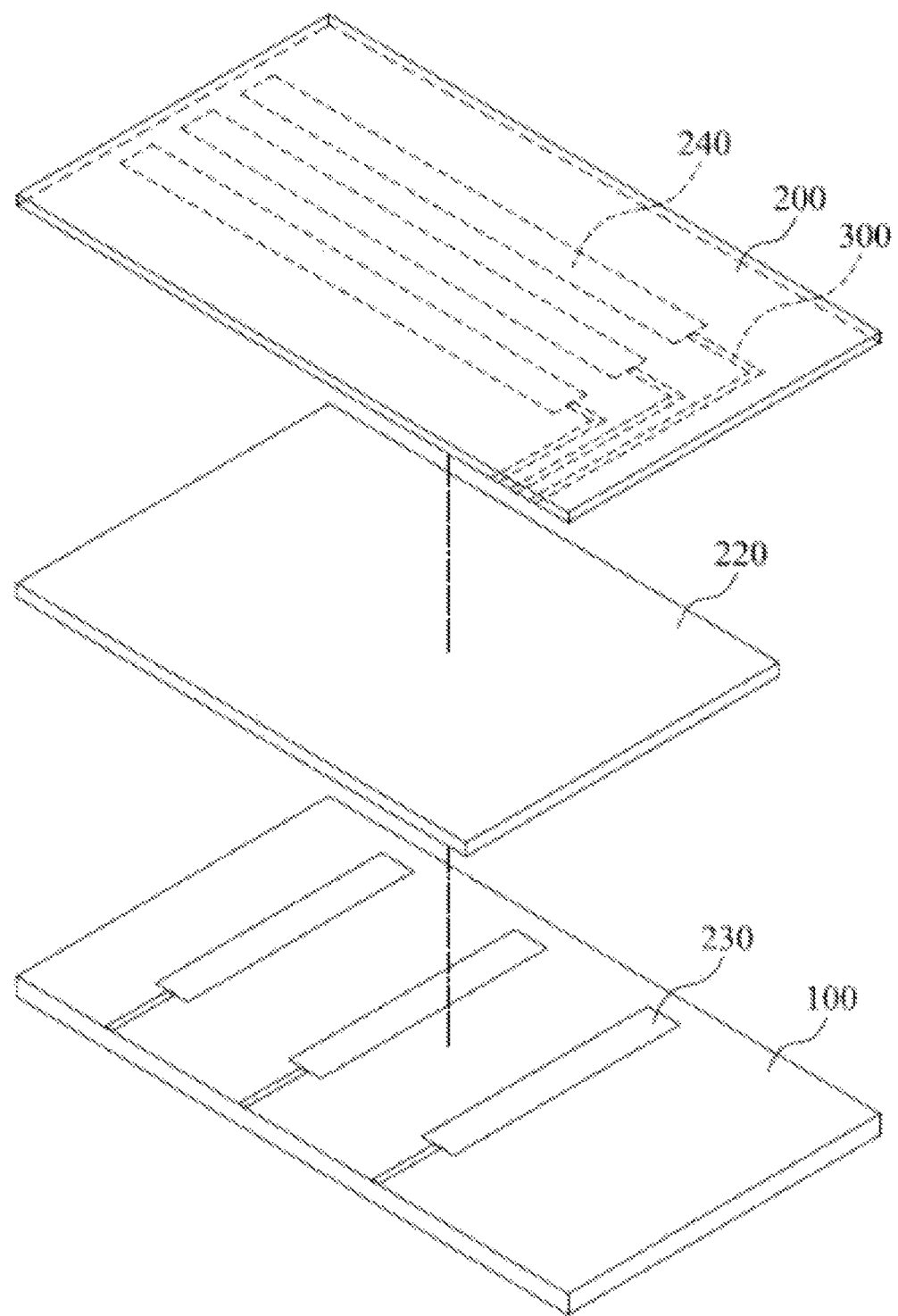
FIG. 4 is an exploded diagram of a touch device in accordance with the present disclosure.

Referring to FIG. 1D and FIG. 4, a cross-sectional view and an exploded view of an exemplary embodiment of a touch device in accordance with present disclosure are illustrated, respectively. In the present embodiment, the touch device comprises a substrate 100, an insulating layer 220, a plurality of first sensing electrodes 230, a plurality of second sensing electrodes 240, and a transfer-printing film 200.

The substrate 100 has a viewing region 110. The plurality of first sensing electrodes 230 are spaced apart from each other on the substrate 100 corresponding to the viewing region 110 and arranged along a first axial direction, such as the x-direction. The insulating layer 220 is formed on the plurality of first sensing electrodes 230. The plurality of second sensing electrodes 240 are spaced apart from each other on the transfer-printing film 200 and arranged along a second axial direction, such as the y-direction. The plurality of second sensing electrodes 240 are transfer-printed onto the insulating layer 220 and are in a staggered arrangement with the plurality of first sensing electrodes 230. The first axial direction and the second axial direction intersect with each other. For example, the first axial direction and the second axial direction are perpendicular to each other, but it is not limited thereto. The insulating layer 220 is disposed between the plurality of first sensing electrodes 230 and the plurality of second sensing electrodes 240, such that the plurality of first sensing electrodes 230 and the plurality of second sensing electrodes 240 are insulated from each other by the insulating layer 220.

In the embodiment, the plurality of second sensing electrodes 240 may be formed onto the insulating layer 220 by a transfer-printing process. For example, the plurality of second sensing electrodes 240 may be formed onto the transfer-printing film 200 by a printing process, such as a gravure printing process. Next, the transfer-printing film 200 having the plurality of second sensing electrodes 240 is attached to the substrate 100, such that the insulating layer 220 is disposed between the plurality of first sensing electrodes 230 and the plurality of second sensing electrodes 240. In the embodiment, the plurality of first sensing electrodes 230 may be formed by a photolithography process including sputtering, exposure and developing process, wherein the materials of the first sensing electrodes 230 may comprise indium tin oxide (ITO), indium zinc oxide (IZO), indium tin fluorine oxide (ITFO), aluminum zinc oxide (AZO), fluorine zinc oxide (FZO), or other high-temperature-resistant materials. In other embodiments, the plurality of first sensing electrodes 230 may be directly formed onto the substrate 100 by a screen printing and etching process. The materials of the plurality of first sensing electrodes 230 and the plurality of second sensing electrodes 240 may be optical transparent conductive ink comprising colloid solution of nano silver, colloid solution of indium tin oxide (ITO), colloid solution of indium zinc oxide (IZO), colloid solution of indium tin fluorine oxide (ITFO), colloid solution of aluminum zinc oxide (AZO), colloid solution of fluorine zinc oxide (FZO), colloid solution of nano carbon tube, or colloid solution of conductive polymer, such as poly(3,4-ethylenedioxythiophene) (PEDOT), wherein the optical transparent conductive ink has a conductivity which is greater than 1/Ωcm.

In the present embodiment, the substrate 100 may further comprise a border region 130 surrounding the viewing region 110. Moreover, the touch device further comprises a plurality of traces 300 disposed on the substrate 100 corresponding to the border region 130, thereby electrically connecting to the plurality of first sensing electrodes 230 and the plurality of second sensing electrodes 240, respectively. In another embodiment, the plurality of traces 300 is formed on a transfer-printing film 210 and then disposed on the substrate 100 corresponding to the border region 130 by the transfer-printing process, thereby electrically connecting to the plurality of first sensing electrodes 230 and the plurality of second sensing electrodes 240.

Figure 1E:
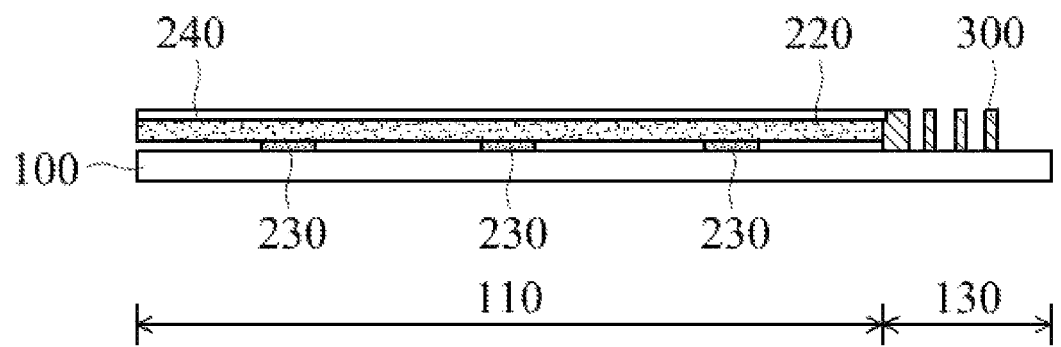

Referring to FIG. 1E, in order to subsequently manufacture other functional layers, such as a protective layer or an anti-refractive layer of the touch device or help the touch device to attach to other electronic elements, such as a display module, the transfer-printing film 200 may be removed or stripped from the substrate 100. When the touch device is attached to other electronic elements, a surface of the substrate 100 that is opposite to the surface of the substrate 100 where the first sensing electrodes 230 are formed thereon, is formed as a touching surface for users.

In the present embodiment, since the transfer-printing process is performed at a low temperature, the previously formed layer structures before the second sensing electrodes 240, such as the insulating layer 220 and the first sensing electrodes 230 would not be damaged by a high temperature. In other embodiments, the insulating layer 220 also can be formed by the transfer-printing process. The previously formed layer structures before the second sensing electrodes 240 and the insulating layer 220, such as the first sensing electrodes 230, would not be damaged by the high temperature. Further, in other embodiments, the insulating layer 220, the first sensing electrodes 230 and the second sensing electrodes 240 can be totally formed by the transfer-printing process.

Figure 3A:
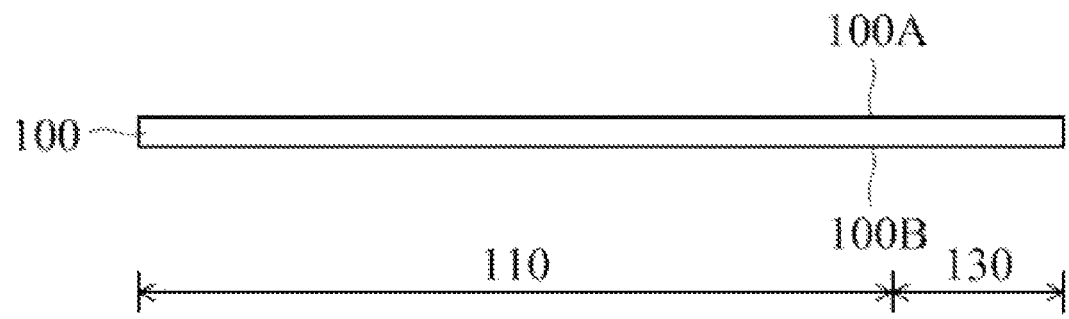
FIGS. 3A to 3C are cross-sectional views of yet another a manufacturing method of a touch device in accordance with an embodiment of the present disclosure.
Figures 1, 3B:
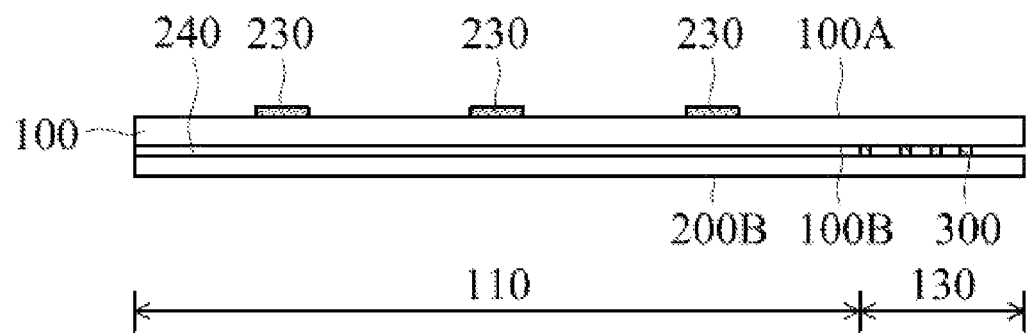

Referring to FIG. 3B-1, a cross-sectional view of yet another exemplary embodiment of a touch device is illustrated in accordance with the present disclosure, wherein elements in FIG. 3B-1 are the same as those in FIG. 1D which are labeled with the same reference numbers as in FIG. 1D and are not described again for the sake of brevity. In the embodiment, the touch device comprises a substrate 100, a plurality of first sensing electrodes 230, a plurality of second sensing electrodes 240, and a second transfer-printing film 200B. In the embodiment, the substrate 100 having a viewing region 110 has a first surface 100A and a second surface 100B opposite to the first surface 100A. The plurality of first sensing electrodes 230 are spaced apart from each other on the first surface 100A of the substrate 100. The plurality of second sensing electrodes 240 are spaced apart from each other on the second transfer-printing film 200B and transfer-printed onto the second surface 100B of the substrate 100. The plurality of first sensing electrodes 230 and the plurality of second sensing electrodes 240 are in a staggered arrangement and disposed on the substrate 100 corresponding to the viewing region 110. The substrate 100 is disposed between the plurality of first sensing electrodes 230 and the plurality of second sensing electrodes 240, such that the plurality of first sensing electrodes 230 and the plurality of second sensing electrodes 240 are insulated from each other by the substrate 100.

In the embodiment, the plurality of second sensing electrodes 240 may be formed onto the second surface 100B of the substrate 100 by a transfer-printing process. For example, the plurality of second sensing electrodes 240 may be formed onto the second transfer-printing film 200B by a printing process, such as a gravure printing process. Next, the second transfer-printing film 200B having the plurality of second sensing electrodes 240 is attached to the second surface 100B of the substrate 100. The materials of the plurality of second sensing electrodes 240 may be the same materials as in the above-mentioned embodiment in FIG. 1D, and are not described again for the sake of brevity herein.

In addition, the touch device further comprises a plurality of traces 300 disposed on the substrate 100 corresponding to the border region 130, thereby electrically connecting to the plurality of first sensing electrodes 230 and the plurality of second sensing electrodes 240. In another embodiment, the plurality of traces 300 is formed onto a transfer-printing film 210 and then disposed between the transfer-printing film 200B and the substrate 100 corresponding to the border region 130 by the transfer-printing process, thereby electrically connecting to the plurality of first sensing electrodes 230 and the plurality of second sensing electrodes 240.

Figures 2, 3B:
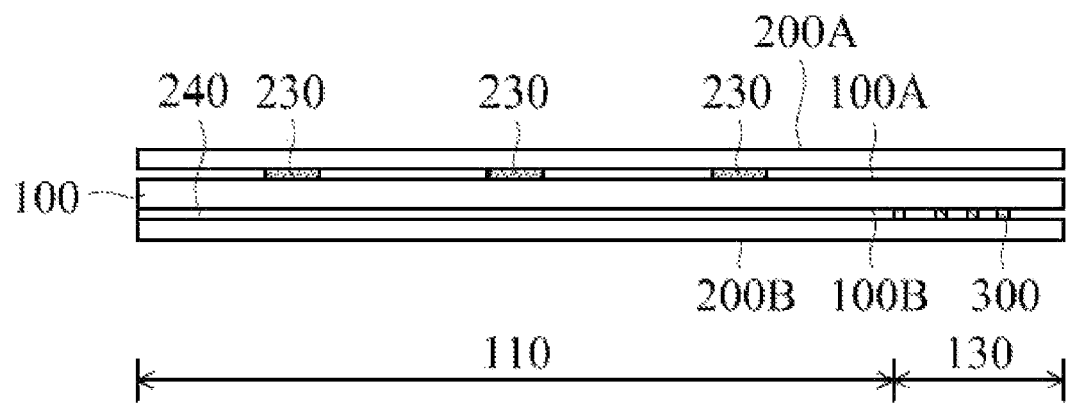

Referring to FIG. 3B-2, in another embodiment, a touch device comprises a first transfer-printing film 200A and a second transfer-printing film 200B, wherein the plurality of first sensing electrodes 230 are formed on the first transfer-printing film 200A and transfer-printed onto the first surface 100A of the substrate 100. The plurality of second sensing electrodes 240 are formed on the second transfer-printing film 200B and transfer-printed onto the second surface 100B of the substrate 100. The materials of the plurality of first sensing electrodes 230 and the plurality of second sensing electrodes 240 are optical transparent conductive ink. The transparent conductive ink comprises colloid solution of nano silver, ITO, IZO, ITFO, AZO, FZO, nano carbon tube, or conductive polymer, wherein the transparent conductive ink has a conductivity which is greater than $1/\Omega cm$.

FIGS. 1A to 1E are cross-sectional views of an exemplary embodiment of a method for fabricating a structure of the touch device corresponding to FIG. 1D in accordance with the present disclosure. Referring to FIG. 1A, a substrate 100 is provided. The substrate 100 is divided into a viewing region 110 and a border region 130 surrounding the viewing region 110. A plurality of first sensing electrodes 230 are formed on the substrate 100 corresponding to the viewing region 110. The plurality of first sensing electrodes 230 are spaced apart from each other and arranged along a first axial direction, such as the x-direction, wherein the plurality of first sensing electrodes 230 may be formed onto the substrate 100 by a transfer-printing process. For example, the plurality of first sensing electrodes 230 are formed onto a transfer-printing film (not shown) by a printing process. Next, the transfer-printing film having the plurality of first sensing electrodes 230 is attached to the substrate 100. Last, the transfer-printing film is stripped. In addition, the plurality of first sensing electrodes 230 may be formed onto the substrate 100 by a printing process. Moreover, the described transfer-printing process may be replaced by sputtering, exposure, and developing processes to form the plurality of first sensing electrodes 230.

Next, referring to FIG. 1B, an insulating layer 220 is formed on the plurality of first sensing electrodes 230, wherein the insulating layer 220 may be formed onto the plurality of first sensing electrodes 230 by a transfer-printing process. For example, the insulating layer 220 may be formed onto a transfer-printing film (not shown) by a printing process, such as a gravure printing process. Next, the transfer-printing film having the insulating layer 220 is attached to the plurality of first sensing electrodes 230. The insulating layer 220 is composed of insulating ink materials, such as optical transparent ink, having a conductivity of less than $10^{-10}/\Omega cm$. In another embodiment, the insulating layer 220 may be formed by a printing process or a deposition process.

Referring to FIGS. 1C to 1D, a plurality of second sensing electrodes 240 that are transfer-printed onto the insulating layer 220 is illustrated. The plurality of second sensing electrodes 240 are spaced apart from each other. The plurality of first sensing electrodes 230 and the plurality of second sensing electrodes 240 are in a staggered arrangement and insulated from each other by the insulating layer 220. First, referring to FIG. 1C, the plurality of second sensing electrodes 240 and a plurality of traces 300 are formed onto a transfer-printing film 200 by a printing process. The plurality of second sensing electrodes 240 is electrically connected to the plurality of traces 300. Preferably, the printing process is a gravure printing process. The plurality of second sensing electrodes 240 and the plurality of traces 300 may be simultaneously formed by the same printing process or respectively formed by different printing processes.

Then, referring to FIG. 1D, the transfer-printing film 200 having the plurality of second sensing electrodes 240 and the plurality of traces 300 is attached to the substrate 100. The plurality of second sensing electrodes 240 corresponds to the viewing region 100 and are in a staggered arrangement with the plurality of first sensing electrodes 230. The insulating layer 220 is disposed between the plurality of first sensing electrodes 230 and the plurality of second sensing electrodes 240, such that the plurality of first sensing electrodes 230 and the plurality of second sensing electrodes 240 are insulated from each other. The plurality of traces 300 corresponds to the border region 130 and is electrically connected to the plurality of first sensing electrodes 230 and the plurality of second sensing electrodes 240, respectively. Moreover, after the step of attaching the transfer-printing film 200 having the plurality of second sensing electrodes 240 and the plurality of traces 300 to the substrate 100, a heat or ultraviolet treatment may be performed according to the selected materials of the transfer-printing film 200, thereby curing the plurality of second sensing electrodes 240 and the plurality of traces 300.

Next, referring to FIG. 1E, in order to subsequently fabricate other functional layers, such as a protective layer or an anti-refractive layer, on the touch device structure or help the touch device structure to attach to other electronic elements, such as a display module, the transfer-printing film 200 may be stripped from the substrate 100. When the touch device structure is attached to other electronic elements, a surface of the substrate 100 is opposite to the surface of the substrate 100 where the plurality of first sensing electrodes 230 is formed thereon, formed for providing a touch function for users.

Figure 2A:
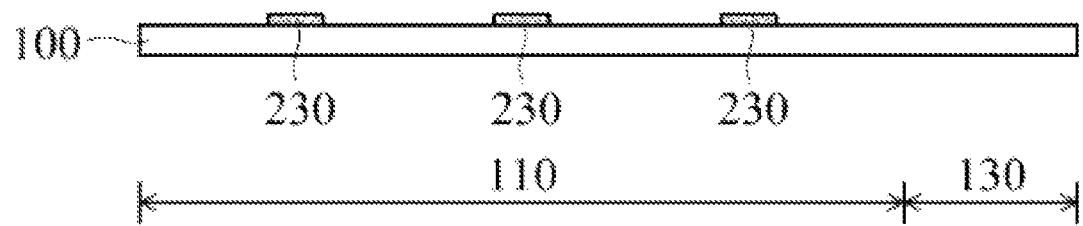
FIGS. 2A to 2E are cross-sectional views of another manufacturing method of a touch device in accordance with an embodiment of the present disclosure.
Figure 2B:
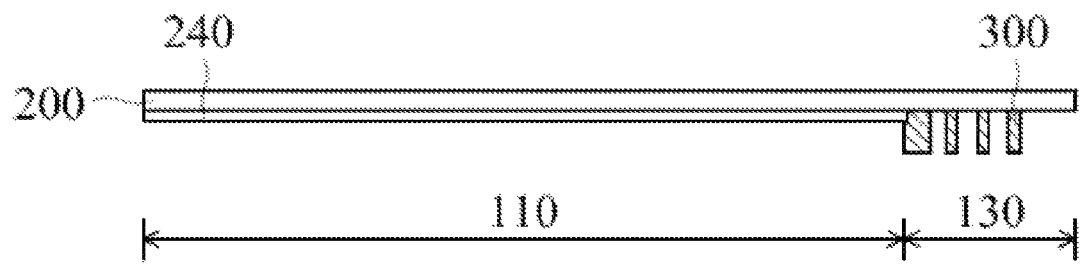
Figure 2C:
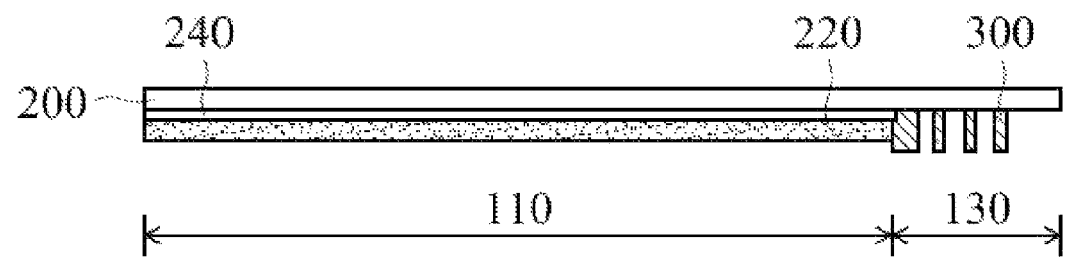
Figure 2D:
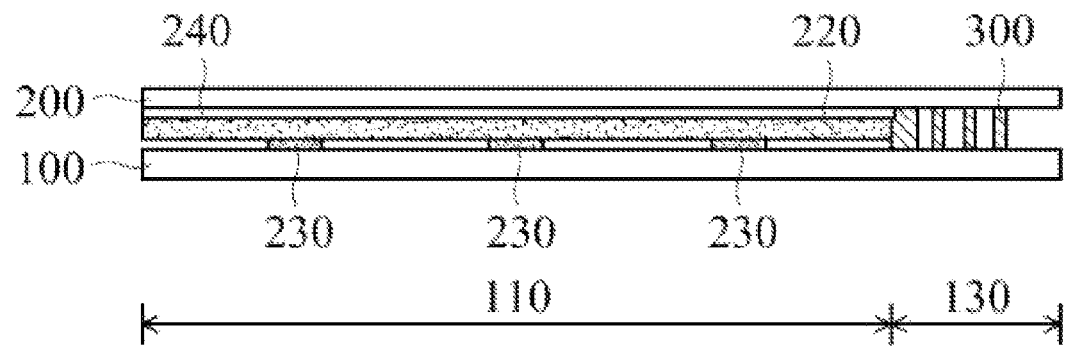

FIGS. 2A to 2D are cross-sectional views of an exemplary embodiment of a method for fabricating the structure of the touch device corresponding to FIG. 2D in accordance with the present disclosure, wherein elements in FIGS. 2A to 2D are the same as those in FIGS. 1A to 1E which are labeled with the same reference numbers as in FIGS. 1A to 1 E and are not described again for the sake of brevity. Referring to FIG. 2A, a substrate 100 is provided. The substrate 100 is divided into a viewing region 110 and a border region 130 surrounding the viewing region 110. A plurality of first sensing electrodes 230 are formed on the substrate 100 corresponding to the viewing region 110. The plurality of first sensing electrodes 230 are spaced apart from each other and arranged along a first axial direction, such as the x-direction, wherein the forming methods of the plurality of first sensing electrodes 230 in the embodiment are substantially the same as those of the corresponding embodiment in FIG. 1A, and so the descriptions are omitted herein for brevity.

Referring to FIGS. 2B to 2D, an insulating layer 220 and a plurality of second sensing electrodes 240 that are transfer-printed onto the plurality of first sensing electrodes 230 are illustrated, wherein the plurality of second sensing electrodes 240 are spaced apart from each other. The plurality of first sensing electrodes 230 and the plurality of second sensing electrodes 240 are in a staggered arrangement insulated from each other by the insulating layer 220. First, referring to FIG. 2B, the plurality of second sensing electrodes 240 and a plurality of traces 300 are formed onto a transfer-printing film 200 by a printing process. The plurality of second sensing electrodes 240 is electrically connected to the plurality of traces 300. Preferably, the printing process is a gravure printing process. The plurality of second sensing electrodes 240 and the plurality of traces 300 may be simultaneously formed by the same printing process or respectively formed by different printing processes.

Then, referring to FIG. 2C, the insulating layer 220 is formed on the plurality of second sensing electrodes 240. For example, the insulating layer 220 is formed onto the plurality of second sensing electrodes 240 by a printing process, such as a gravure printing process. The insulating layer 220 may be composed of insulating ink materials, such as optical transparent ink, having a conductivity of less than $10^{-10}/\Omega cm$.

Next, referring to FIG. 2D, the transfer-printing film 200 having the insulating layer 220, the plurality of second sensing electrodes 240 and the plurality of traces 300 is attached to the substrate 100. The plurality of second sensing electrodes 240 correspond to the viewing region 100 and are in a staggered arrangement with the plurality of first sensing electrodes 230. The insulating layer 220 is disposed between the plurality of first sensing electrodes 230 and the plurality of second sensing electrodes 240, such that the plurality of first sensing electrodes 230 and the plurality of second sensing electrodes 240 are insulated from each other. The plurality of traces 300 correspond to the border region 130 and are electrically connected to the plurality of first sensing electrodes 230 and the plurality of second sensing electrodes 240, respectively. Moreover, after the step of attaching the transfer-printing film 200 having the insulating layer 220, the plurality of second sensing electrodes 240 and the plurality of traces 300 to the substrate 100, a heat or ultraviolet treatment may be performed according to the selected materials of the transfer-printing film 200, thereby curing the insulating layer 220, the plurality of second sensing electrodes 240 and the plurality of traces 300.

Figure 2E:
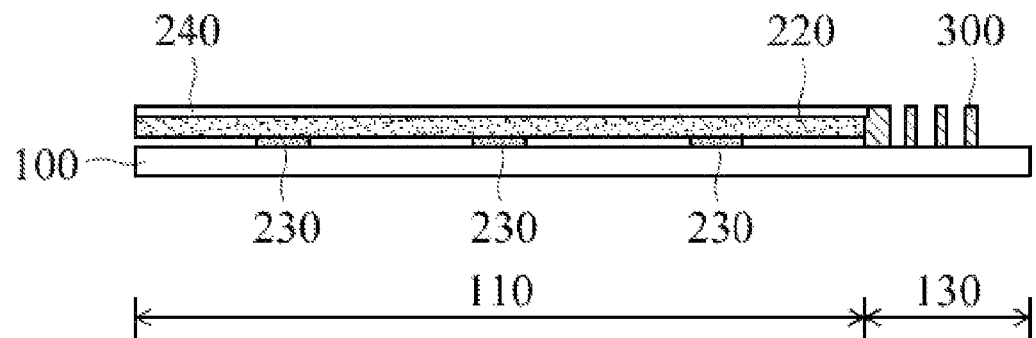

Next, referring to FIG. 2E, in order to subsequently fabricate other functional layers, such as a protective layer or an anti-refractive layer, on the touch device structure or help the touch device structure to attach to other electronic elements, such as a display module, the transfer-printing film 200 may be removed or stripped from the substrate 100. When the touch device structure is attached to other electronic elements, a surface of the substrate 100 that is opposite to the surface of the substrate 100 where the plurality of first sensing electrodes 230 is formed thereon, is formed as a touching surface for users.

Figure 3C:
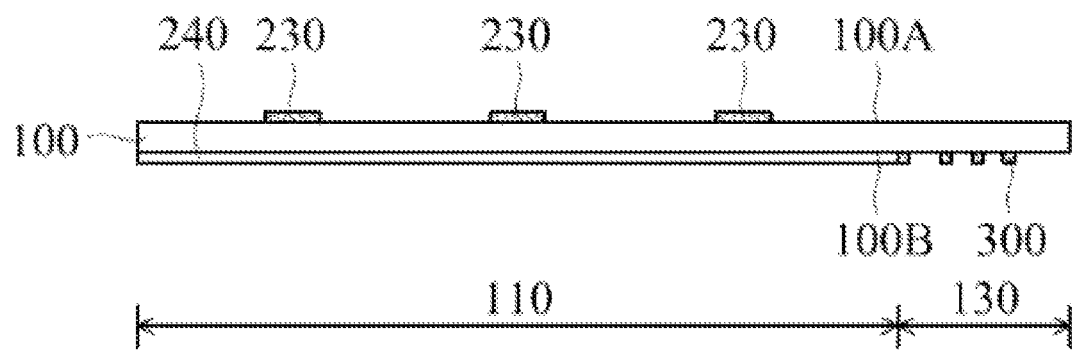

FIGS. 3A to 3C are cross-sectional views of an exemplary embodiment of a method for fabricating the touch device corresponding to FIGS. 3B-1 and 3B-2 in accordance with the present disclosure, wherein elements in FIGS. 3A to 3C are the same as those in FIGS. 1A to 1E which are labeled with the same reference numbers as in FIGS. 1A to 1E and are omitted here for the sake of brevity. Referring to FIG. 3A, a substrate 100 is provided. The substrate 100 is divided into a viewing region 110 and a border region 130 surrounding the viewing region 110. Moreover, the substrate 100 has a first surface 100A and a second surface 100B opposite to the first surface 100A.

Then, referring to FIG. 3B-1, a plurality of first sensing electrodes 230 is formed on the first surface 100A of the substrate 100 corresponding to the viewing region 110 and spaced apart from each other. In the embodiment, the plurality of first sensing electrodes 230 may be formed onto the substrate 100 by a printing process or by sputtering, exposure, and developing processes.

Next, a second transfer-printing film 200B is provided to transfer-print a plurality of second sensing electrodes 240 onto the second surface 100B of the substrate 100. For example, the plurality of second sensing electrodes 240 and a plurality of traces 300 are formed onto the second transfer-printing film 200B by a printing process. Preferably, the printing process is a gravure printing process, and the plurality of second sensing electrodes 240 and the plurality of traces 300 may be simultaneously formed by the same printing process or respectively formed by different printing processes. The second transfer-printing film 200B having the plurality of second sensing electrodes 240 and the plurality of traces 300 is then attached to the second surface 100B of the substrate 100. The plurality of second sensing electrodes 240 correspond to the viewing region 100 and are in a staggered arrangement with the plurality of first sensing electrodes 230. The substrate 100 is disposed between the plurality of first sensing electrodes 230 and the plurality of second sensing electrodes 240, such that the plurality of first sensing electrodes 230 and the plurality of second sensing electrodes 240 are insulated from each other. The plurality of traces 300 correspond to the border region 130 and are electrically connected to the plurality of first sensing electrodes 230 and the plurality of second sensing electrodes 240, respectively. Moreover, after the step of attaching the second transfer-printing film 200B having the plurality of second sensing electrodes 240 and the plurality of traces 300 to the substrate 100, a heat or ultraviolet treatment may be performed according to the selected materials of the second transfer-printing film 200B, thereby curing the plurality of second sensing electrodes 240 and the plurality of traces 300.

Referring to FIG. 3B-2, in another embodiment, a first transfer-printing film 200A is provided. A plurality of first sensing electrodes 230 and a plurality of traces (not shown) electrically connected to the plurality of first sensing electrodes 230 are formed onto the first transfer-printing film 200A by a printing process. Preferably, the printing process is a gravure printing process. The first transfer-printing film 200A having the plurality of first sensing electrodes 230 and the plurality of traces electrically connected thereto is then attached to the first surface 100A of the substrate 100. The plurality of first sensing electrodes 230 correspond to the viewing region 110 and the plurality of traces correspond to the border region 130. Next, a second transfer-printing film 200B is provided. A plurality of second sensing electrodes 240 and a plurality of traces 300 electrically connected the plurality of second sensing electrodes 240 are formed onto the second transfer-printing film 200B by a printing process. Preferably, the printing process is a gravure printing process. The second transfer-printing film 200B having the plurality of second sensing electrodes 240 and the plurality of traces 300 is then attached to the second surface 100B of the substrate 100. The plurality of second sensing electrodes 240 correspond to the viewing region 100 and the plurality of traces 300 correspond to the border region 130. The plurality of second sensing electrodes 240 are in a staggered arrangement with the plurality of first sensing electrodes 230. The substrate 100 is disposed between the plurality of first sensing electrodes 230 and the plurality of second sensing electrodes 240, such that the plurality of first sensing electrodes 230 and the plurality of second sensing electrodes 240 are insulated from each other. Moreover, after the step of attaching the second transfer-printing film 200B having the plurality of second sensing electrodes 240 and the plurality of traces 300 to the substrate 100, a heat or ultraviolet treatment may be performed according to the selected materials of the first transfer-printing film 200A or the second transfer-printing film 200B, thereby curing the plurality of first sensing electrodes 230, the plurality of traces electrically connected to the plurality of first sensing electrodes 230, the plurality of second sensing electrodes 240 and the plurality of traces 300.

Next, referring to FIG. 3C, in the above-mentioned embodiments in FIGS. 3B-1 and 3B-2, after the step of attaching the first transfer-printing film 200A and the second transfer-printing film 200B to the substrate 100, in order to subsequently fabricate other functional layers, such as a protective layer or an anti-refractive layer of the touch device structure or help the touch device structure to attach to other electronic elements, such as a display module, the first transfer-printing film 200A and the second transfer-printing film 200B may be removed or stripped from the substrate 100.

In the above-mentioned embodiments, the substrate 100 may be composed of glass, plastic film, or another conventional transparent substrate material. The insulating layer 220 may be composed of the insulating ink materials, such as optical transparent ink, having a conductivity of less than $10^{-10}/\Omega cm$. The plurality of traces 300 may be composed of conductive ink, such as silver colloid, copper colloid or carbon colloid, having a conductivity which is greater than $1/\Omega cm$. The transfer-printing film 200, the first transfer-printing film 200A and second the transfer-printing film 200B may be composed of flexible plastic film, such as polyethylene terephthalate (PET), polyethylene, polypropylene, polyvinyl chloride, polystyrene, polyvinyl alcohol, or polyimide. Moreover, the transfer-printing film may have a thickness of between 20 μm and 200 μm.

According to the embodiments, the insulating layer and the sensing electrodes of the touch device are formed by a transfer-printing process, such that a multi-layer structure is formed in two parts. Compared to the conventional fabrication method including the sputtering, exposure, and developing processes, damage to a previously formed layer structure during the formation of a subsequently formed layer structure thereon may be reduced or eliminated, thereby improving the yield and material selectivity of the sensing electrodes of the touch device. Accordingly, the material of the sensing electrodes is not limited to high temperature resistant materials. Moreover, the use of the transfer-printing process instead of the sputtering, exposure, and developing processes can simplify the manufacturing process and improve production efficiency. In addition, the use of expensive equipment (such as the equipment for the sputtering, exposure, and developing processes) is not required. Therefore, price competitiveness can be improved and the pollution caused by chemical solutions can be reduced.

While the present disclosure has been described by way of example and in terms of preferred embodiment, it is to be understood that the present disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A manufacturing method of a touch device, comprising:
   providing a substrate having a viewing region;
   forming a plurality of first sensing electrodes spaced apart from each other on the substrate corresponding to the viewing region;
   forming an insulating layer on the plurality of first sensing electrodes; and
   transfer-printing a plurality of second sensing electrodes onto the insulating layer, wherein the plurality of second sensing electrodes are spaced apart from each other, and wherein the plurality of first sensing electrodes are in a staggered arrangement with the plurality of second sensing electrodes and insulated from the plurality of second sensing electrodes by the insulating layer.

2. The manufacturing method of claim 1, wherein the step of transfer-printing the plurality of second sensing electrodes onto the insulating layer comprises:
   forming the plurality of second sensing electrodes on a transfer-printing film; and
   attaching the transfer-printing film having the plurality of second sensing electrodes to the substrate, such that the insulating layer is disposed between the plurality of first sensing electrodes and the plurality of second sensing electrodes.

3. The manufacturing method of claim 2, wherein the plurality of second sensing electrodes are formed onto the transfer-printing film by a printing process.

4. The manufacturing method of claim 2, further comprising removing the transfer-printing film after the step of attaching the transfer-printing film to the substrate.

5. The manufacturing method of claim 1, wherein the insulating layer is formed by a transfer-printing process.

6. The manufacturing method of claim 5, wherein the insulating layer and the plurality of second sensing electrodes are formed by the transfer-printing process through one transfer-printing film, and wherein the transfer-printing process comprises:
   forming the plurality of second sensing electrodes spaced apart from each other on the transfer-printing film;
   forming the insulating layer on the plurality of second sensing electrodes; and
   attaching the transfer-printing film having the insulating layer and the plurality of second sensing electrodes to the substrate, such that the insulating layer is disposed between the plurality of first sensing electrodes and the plurality of second sensing electrodes.

7. The manufacturing method of claim 6, wherein the plurality of second sensing electrodes are formed onto the transfer-printing film by a first printing process and the insulating layer is formed onto the plurality of second sensing electrodes by a second printing process.

8. The manufacturing method of claim 1, wherein the substrate further comprises a border region surrounding the viewing region, and the method further comprises forming a plurality of traces on the substrate corresponding to the border region, wherein the plurality of traces is electrically connected to the plurality of first sensing electrodes and the plurality of second sensing electrodes, respectively.

9. The manufacturing method of claim 8, wherein the plurality of traces are formed by a transfer-printing process.

10. A manufacturing method of a touch device, comprising:
- providing a substrate having a viewing region, wherein the substrate has a first surface and a second surface opposite to the first surface;
- forming a plurality of first sensing electrodes spaced apart from each other on the first surface; and
- transfer-printing a plurality of second sensing electrodes spaced apart from each other onto the second surface, wherein the plurality of first sensing electrodes are in a staggered arrangement with the plurality of second sensing electrodes and insulated from the plurality of second sensing electrodes by the substrate.

11. The manufacturing method of claim 10, wherein the step of transfer-printing the plurality of second sensing electrodes onto the second surface comprises:
- forming the plurality of second sensing electrodes spaced apart from each other on a second transfer-printing film; and
- attaching the second transfer-printing film having the plurality of second sensing electrodes to the second surface of the substrate.

12. The manufacturing method of claim 11, wherein the step of forming the plurality of first sensing electrodes onto the first surface comprises:
- forming the plurality of first sensing electrodes spaced apart from each other on a first transfer-printing film; and
- attaching the first transfer-printing film having the plurality of first sensing electrodes to the first surface of the substrate.

13. The manufacturing method of claim 12, further comprising stripping the first transfer-printing film and the second transfer-printing film after the step of attaching the first transfer-printing film to the substrate.

14. The manufacturing method of claim 11, further comprising stripping the second transfer-printing film after the step of attaching the second transfer-printing film to the substrate.

15. The manufacturing method of claim 10, wherein the substrate further comprises a border region surrounding the viewing region, and the method further comprises transfer-printing a plurality of traces onto the substrate corresponding to the border region, wherein the plurality of traces is electrically connected to the plurality of first sensing electrodes and the plurality of second sensing electrodes, respectively.

16. A touch device, comprising:
- a substrate having a viewing region;
- a plurality of first sensing electrodes spaced apart from each other on the substrate corresponding to the viewing region;
- an insulating layer disposed on the plurality of first sensing electrodes; and
- a plurality of second sensing electrodes spaced apart from each other on the insulating layer by a transfer-printing process, and wherein the plurality of first sensing electrodes are in a staggered arrangement with the plurality of second sensing electrodes and insulated from the plurality of second sensing electrodes by the insulating layer.

17. The touch device of claim 16, further comprising a transfer-printing film, wherein the second sensing electrodes are disposed on the transfer-printing film.

18. The touch device of claim 17, wherein the insulating layer and the plurality of second sensing electrodes are formed by the transfer-printing process through the transfer-printing film.

19. The touch device of claim 16, wherein the substrate further comprises a border region surrounding the viewing region, and the touch device further comprises a plurality of traces disposed on the substrate corresponding to the border region, wherein the plurality of traces is electrically connected to the plurality of first sensing electrodes and the plurality of second sensing electrodes, respectively.

20. A touch device, comprising:
- a substrate having a viewing region, wherein the substrate has a first surface and a second surface opposite to the first surface;
- a plurality of first sensing electrodes spaced apart from each other on the first surface of the substrate; and
- a plurality of second sensing electrodes spaced apart from each other on the second surface of the substrate by a transfer-printing process, and wherein the plurality of first sensing electrodes is in a staggered arrangement with the plurality of second sensing electrodes and insulated from the plurality of second sensing electrodes by the substrate.

21. The touch device of claim 20, further comprising a first transfer-printing film, wherein the plurality of first sensing electrodes are disposed on the first transfer-printing film and disposed on the first surface of the substrate by another transfer-printing process.

22. The touch device of claim 20, wherein the substrate further comprises a border region surrounding the viewing region, and the structure of the touch device further comprises a plurality of traces disposed on the substrate corresponding to the border region, wherein the plurality of traces is electrically connected to the plurality of first sensing electrodes and the plurality of second sensing electrodes, respectively.

* * * * *